United States Patent [19]

Palladino et al.

[11] 4,100,334

[45] Jul. 11, 1978

[54] PROCESS FOR RENDERING POLYMERS DEGRADABLE AND POLYMERS OBTAINED THEREBY

[75] Inventors: Nicola Palladino, Monterotondo; Marcello Mazzei, Milan; Walter Marconi, San Donato Milanese, all of Italy

[73] Assignee: Snam Progetti S.p.A., San Donato Milanese, Italy

[21] Appl. No.: 644,889

[22] Filed: Dec. 29, 1975

Related U.S. Application Data

[63] Continuation of Ser. No. 441,166, Feb. 11, 1974, abandoned.

[30] Foreign Application Priority Data

Jan. 15, 1973 [IT]  Italy ............................. 19199 A/73

[51] Int. Cl.$^2$ ................................................ C08J 3/20
[52] U.S. Cl. ............................... 526/1; 260/DIG. 43
[58] Field of Search ................... 526/1; 260/DIG. 43

[56] References Cited

U.S. PATENT DOCUMENTS

| 3,341,357 | 9/1967 | Feild ..................................... 106/27 |
| 3,797,690 | 3/1974 | Taylor et al. ................. 260/DIG. 43 |
| 3,935,141 | 1/1976 | Potts et al. .................... 260/DIG. 43 |

*Primary Examiner*—Eugene C. Rzucidlo
*Attorney, Agent, or Firm*—Morgan, Finnegan, Pine, Foley & Lee

[57] ABSTRACT

Polymers of the type commonly used in packaging are rendered degradable through the action of sunlight by adding thereto up to 3% of an olefinically unsaturated compound containing at least two double bonds, such as 1,6-diphenylhexatriene.

2 Claims, No Drawings

PROCESS FOR RENDERING POLYMERS DEGRADABLE AND POLYMERS OBTAINED THEREBY

This is a continuation, of application Ser. No. 441,166 filed Feb. 11, 1974 now abandoned.

The present invention relates to a process for rendering polymers degradable and also to the polymers obtained thereby.

More particularly the present invention relates to a process for rendering thermoplastic materials degradable through the direct action of the sun light.

It is known that resistance to atmospheric and microbial agents, one factor which promoted the board diffusion of the plastic materials particularly in the packing industry, gave rise to the problem of the storing of plastic waste material in the natural environment.

In order to overcome the aforesaid drawback solutions have been proposed as, the employment of essentially unstable polymers or the use of additives which let the more common polymers undergo a photodegradation reaction selectively excited by the ultraviolet radiations of the sun spectrum.

In fact, for limited uses of the agricultural type, they proposed to employ polybutene-1 and copolymers, syndiotactic polybutadiene 1-2 and copolymers.

On the contrary, regarding the plastic materials used for packing which now are the main source of wastes, the proposed solutions based on introducing into the polymers more commonly used, both through copolymerization and through additives, groups photosensitive to near ultraviolet and able to give rise to photooxidation reaction when the polymer is subjected to the direct action of the sun light.

According to this solution, the use styrene copolymers with vinylketons and carbon oxide, and copolymers constituted by ethylene and carbon oxide have been proposed.

In the additive field it was proposed to use iron dialkyldithio-carbamates or other complexes of transition metals, gamma-pyrone derivatives, alkyl, alkylaryl and aryl ketone and other systems which, generally acting as hydrogen extractors when subjected to the direct action of the sun light are able to give rise to an accelerated photooxidation of the polymer. Such types of additives have the drawback of remarkable self-delay phenomena and moreover undergo a remarkable decrease in activity when the additive is alkylated or grafted to the polymer in order to reduce its migration.

It has now been found, which is an subject of the present invention, that it is possible to overcome the aforesaid drawbacks through the employment of olefinically unsaturated compounds containing systems of two or more bonds, preferably conjugated, in the production of polymer having a controlled degradation which, in turn, constitute a second aspect of the present invention; the conjugated double bonds may be conjugated also with aromatic residues.

The inventive process fundamentally consists in adding to the plastic material, which may contain commercial additives already commonly used such as antioxidants, softening agents, antistatic agents or other ones, an olefinally unsaturated compound containing at least two double bonds, preferably conjugated, having the following general formula

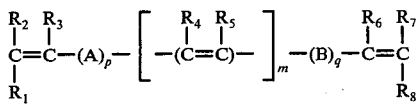

in which $R_1$, $R_2$, $R_3$, $R_4$, $R_5$, $R_6$, $R_7$ and $R_8$, the same or different, may be hydrogen, or an alkyl, aryl, cycloalkyl, arylalkyl, alkylaryl radical; pairs of which may be divalent radicals adapted to form a ring also containing unsaturations, which may be conjugated with the unsaturations already present; A and B are divalent alkyl, aryl, cycloalkyl, arylalkyl or alkylaryl radicals, the indexes $p$ and $q$ being 0 or 1; $n$ may be 0, or an integer ranging from 1 to 12; however it is always null if no R radical is an aryl radical.

Examples of olefinically unsaturated compounds which may be employed according to the inventive process are the ones hereinafter reported:

(1) 1,6 - diphenylhexatriene (1,6 DPHT)
(2) 5-phenyl-1,3-pentadiene
(3) octa-2,4,6-triene
(4) 2-methyl-1,3,5-hexatriene
(5) 2,6-dimethyl-2,4,6-octatriene Without speculating upon the reaction mechanism we think that the additives employed in the inventive process are able to photosensitize the activation of molecular oxygen as the main factor in the accelerated degradation of the thermoplastic polymers in the presence of the sun light.

The process itself is carried out by adding to the plastic material containing the commercial additive the aforesaid unsaturated compound in an amount up to 3%, preferably ranging from 0.1 to 1% by weight.

The additive may be introduced into the polymer according to known techniques such as, for instance, dust mixing and mastication.

The operating particulars will be better understood from the consideration of the following examples, reported only for better illustrating the invention without limiting the purpose thereof.

EXAMPLE 1

Commercial high density polyethylene, containing small amounts of antioxidants, antistatic agents and other usual ingredients, and 1,6 diphenylhexatriene were mixed, according to known methods, in the amounts of 0.1, 1 and 3 g of 1,6 DPHT per 100 g of polymer.

The films were obtained by melting in a press CARVER heated to 200° C; samples were obtained having about a 0.02 cm thickness.

Such films were subjected to the radiations of a high pressure xenon lamp which showed a spectrum energy similar to the one of the sun light.

The degradation rate was followed by means of the infra-red spectroscopy by measuring the area of the bands from 5.65 to 6 characteristic of the carboxyl groups, whose appearance in the polymer is to be correlated to the loss of the physical and mechanical properties thereof.

For this purpose a calibration curve was set up by employing stearone as a standard sample: we plotted the CO number per gram of polymer against the ratio between the area of the bands from 5.65 and 6 and the film thickness.

During the exposure of the films the temperature was kept constant at 29°—32° C.

The following table reports the results obtained from the exposures of both the treated polymer and the untreated one to the xenon lamp.

| Samples | CO number/g Pol.$10^5$ after the following hours of exposure at 29–32° C | | | |
|---|---|---|---|---|
|  | 0 | 28 | 60 | 90 |
| Polyethylene (PE) without any additive | 0 | 1.2 | 2.2 | 2.6 |
| Polyethylene + 1.6-diphenylhexatriene (DPHT) 0.1% | 0 | 3.4 | 9.1 | 9.2 |
| " 1% | 0 | 6.0 | 11.4 | 13.8 |
| " 3% | 1.2 | 12.4 | 23 | 23.2 |

The results reported in the table emphasize the higher degradation rate of the polymer to which 1.6-diphenylhexatriene has been added.

Hereinafter we report the MFI (Melt Flow Index) value of the polymer with additive and of the one containing no additive.

It is to be noted that the effect of the additive on the viscosity of the melted product is negligible.

| Samples | MFI at 190° C |
|---|---|
| PE without any additive | 1.25 |
| PE + DPHT 0.1% | 1.24 |
| PE + DPHT 1% | 1.50 |

EXAMPLE 2

To commercial low density polyethylene containing small amounts of usual stabilizers were added 1.6-diphenylhexatriene in amounts equal to 0.1, 1 and 3 parts per 100 parts of polymer.

The films were obtained and exposed to the xenon lamp according to what said in example 1.

The degradation rate was followed by the I.R. spectroscopy and according to the methodology described in the previous example.

The obtained results are reported in the following table.

| Sample | CO number/g Pol. $10^5$ after the following exposure hours at 29–32° C | | | |
|---|---|---|---|---|
|  | 0 | 30 | 60 | 90 |
| LD PE without any additive | — | — | — | 1.4 |
| LD PE + 1.6 DPHT 0.1% | 0 | 3.1 | 7.8 | 7.9 |
| " + " 1% | 0 | 15.8 | 22.6 | 27.2 |
| " + " 3% | 2.2 | 21 | 37.4 | 38.8 |

Also this example clearly emphasizes the higher degradation rate of the polymers containing 1.6-diphenylhexatriene.

EXAMPLE 3

The present example shows the behaviour of a commercial ethylene-vinylacetate (VA) copolymer, having 2% of nominal weight, a melt flow index of about 1.1 and 0.9268 density at 23° C, to which were added 1.6-diphenylhexatriene (1 g per 100 g of polymer) and exposed to a xenon lamp.

The exposed samples were obtained according to the preceding examples. The degradation rate of the polymer was correlated with the time necessary for it to become brittle.

The obtained results are reported in the following table.

| Sample | Time necessary for letting the polymer be brittle |
|---|---|
| PE - VA as such | >350 h |
| PE - Va + 1.6 DPHT 1% | 220 h |

The shorter time within which the polymer and 1.6-diphenylhexatriene became brittle shows the higher degradation rate thereof.

EXAMPLE 4

Some films of commercial polypropylene (PP), containing or not 1.6-diphenylhexatriene and obtained as the samples of the preceding examples, were subjected to a radiations of the high pressure xenon lamp.

The polymer degradation rate was followed by I.R. spectroscopy. A calibration curve was set up by using stearone as a standard according to example 1.

Hereinafter we report the times necessary for the polymers to become brittle

| Samples | Time necessary for letting the polymers to become brittle |
|---|---|
| PP as such | >110 h |
| PP + 1.6 DPHT 1% | 60 h |

The degradation rate was higher for the polymer to which 1.6-diphenylhexatriene was added.

EXAMPLE 5

To commercial low density polyethylene was added 1% of allo-ocymene (2,6-dimethyl-2,4,6 octatriene) according to the preceding examples. The films were subjected to the radiations of a xenon lamp according to example 1. The degradation rate of samples was determined by I.R. spectroscopy.

The following table reports the obtained results.

| Samples | CO number per g polyethylene .$10^5$ after the following exposure hours | | | |
|---|---|---|---|---|
|  | 0 | 30 | 60 | 90 |
| PE as such | — | — | 1.4 | 1.6 |
| PE + 1% allo-ocymene | — | 4.2 | 6.1 | 10.5 |

What we claim is:

1. A process for rendering a thermoplastic, film forming polymeric material adapted for use in packaging, degradable through the direct action of sunlight, said process consisting in adding to said polymeric material from 0.1 to 3% by weight of a compound selected from the group consisting of:
    (1) 1,6-diphenylhexatriene;
    (2) octa-2,4,6-triene;
    (3) 2-methyl-1-3,5-hexatriene; and
    (4) 2,6-dimethyl-2,4,6-octatriene.

2. A composition which consists essentially of a thermoplastic film forming polymeric material adapted for use in packaging and from 0.1 to 3% by weight of a compound selected from the group consisting of:
    (1) 1,6-diphenylhexatriene;
    (2) octa-2,4,6-triene;
    (3) 2-methyl-1,3,5-hexatriene; and
    (4) 2,6-dimethyl-2,4,6-octatriene.

* * * * *